Patented May 27, 1924.

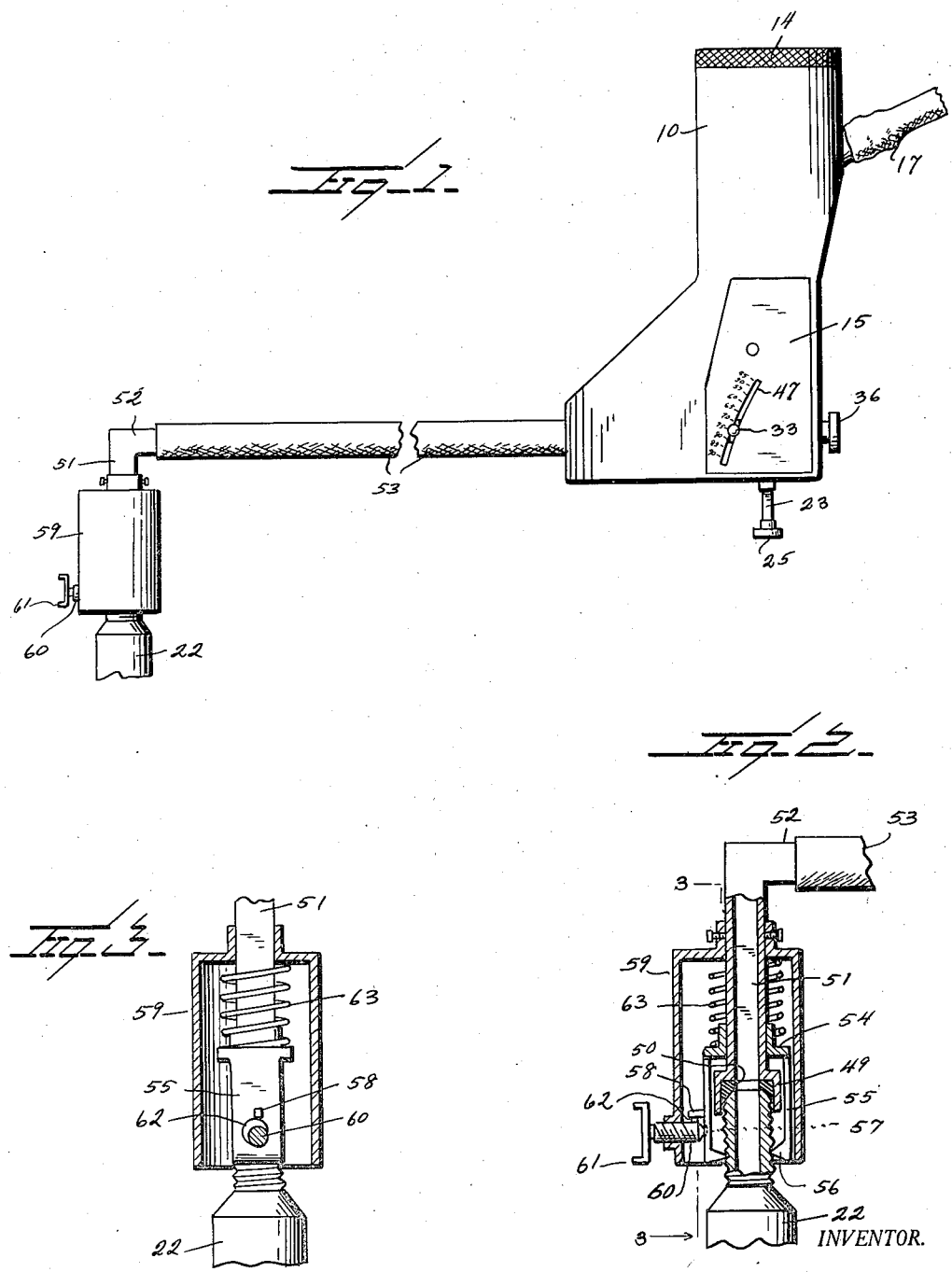

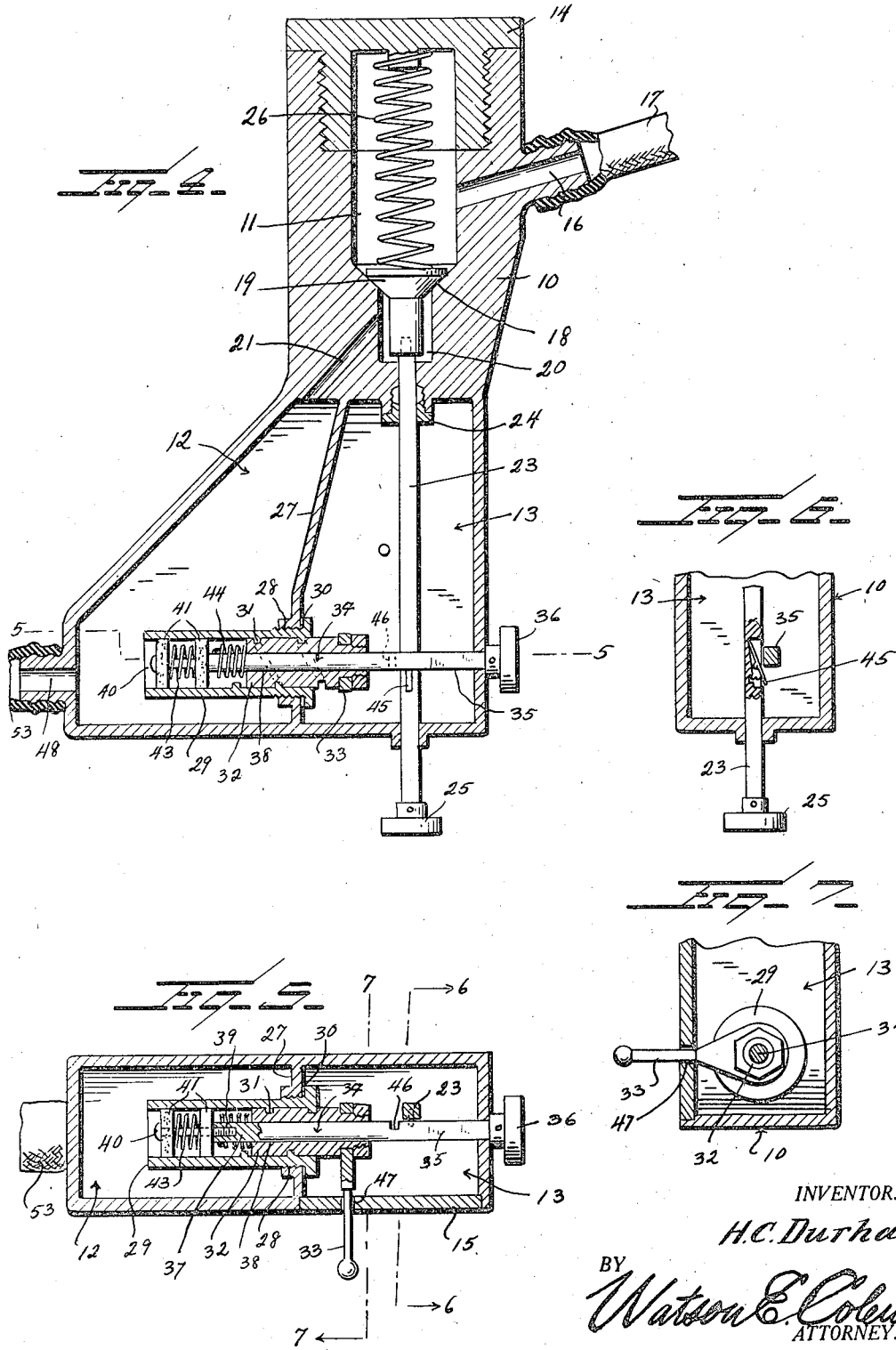

1,495,553

UNITED STATES PATENT OFFICE.

HARVEY C. DURHAM, OF PORT ARTHUR, TEXAS.

AUTOMATIC INFLATING GAUGE.

Application filed April 28, 1923. Serial No. 635,253.

*To all whom it may concern:*

Be it known that I, HARVEY C. DURHAM, a citizen of the United States, residing at Port Arthur, in the county of Jefferson and State of Texas, have invented certain new and useful Improvements in Automatic Inflating Gauges, of which the following is a specification, reference being had to the accompanying drawings.

This invention relates to automatic inflating gauges and more particularly to a gauge for controlling the admission of air to the tube of a tire to provide within the tube a predetermined inflation pressure.

An object of the invention is to provide a device of this character which is simple a device of this character which is simple in its construction, durable in service and a general improvement in the art.

A further object of the invention is to provide a novel and improved means for connecting devices of this character to the tire tube.

These and other objects I attain by the construction and arrangement shown in the accompanying drawings, wherein for the purpose of illustration is shown a preferred embodiment of my invention and wherein like reference characters designate like parts throughout.

In the drawings:—

Figure 1 is a side elevation of an inflating gauge and valve stem engaging means constructed in accordance with my invention;

Figure 2 is a transverse sectional view through the valve stem engaging means;

Figure 3 is a section on the line 3—3 of Figure 2;

Figure 4 is a vertical sectional view through the inflating gauge;

Figure 5 is a transverse sectional view therethrough;

Figure 6 is a section on the line 6—6 of Figure 5; and

Figure 7 is a section on the line 7—7 of Figure 5.

Referring now more particularly to the drawings, the numeral 10 designates a casing formed to provide three separate compartments indicated at 11, 12 and 13. The compartment 11 has an open outer end closed by a removable screw cap 14 and the compartment 13 is closed by a removable cover plate 15, the compartment 12 being closed in any suitable manner. The compartment 11 has a port 16 adapted for connection with a suitable source of air under pressure by means of a flexible conduit 17. At the end of the compartment, opposite the removable cap 14, a valve seat 18 is formed, upon which seats a valve 19, the stem of which projects into a conduit 20 which is in communication through a port 21 with the compartment 12. This port, for a reason presently to appear, is of a diameter less than the diameter of the opening of the valve stem 22 by means of which air is admitted to the tube. Connected with the stem of the valve 19 is an operating rod 23, which extends through a packing gland 24, through the compartment 13 and through the wall of the casing 10 and is provided with a handle 25 by means of which it may be operated. Between the removable cap 14 and the valve 18, a compression spring 26 is disposed, normally tending to seat this valve.

Formed in the partition wall 27, between the compartments 12 and 13, is a threaded opening 28 in which is engaged the threaded end of a tube 29 disposed within the compartment 12, the tube having an air tight engagement with the compartment wall as at 30. The interior of this tube is provided with quick running threads 31 which are engaged by corresponding threads of a guide sleeve 32 having an end portion thereof reduced, projecting beyond the end of the tube 29 within the compartment 13 and provided with an operating handle 33 by means of which it may be oscillated. The numeral 34 designates a control rod, an end portion of which is squared, as indicated at 35, and extends through the wall of the casing 10 forming a wall of the compartment 13 and is provided with an operating handle 36, the opposite end portion of the control rod 34 being aligned, as indicated at 37, and slidably directed through the bore 38 of the sleeve 32. The end of this aligned portion is provided with a threaded socket 39 in which is arranged a screw 40 forming a continuation of the aligned portion and upon which are mounted two disc washers or pistons 41 having interposed in between and disposed about the adjusting screw a spring 43 for maintaining these washers spread and the peripheral portions thereof in sealing engagement with the walls of the tube. A compression spring 44 has one end thereof abutting that end of the sleeve 32 directed toward the compartment 12 and the opposite end thereof connected to the outer end of the aligned portion 32 of the control rod and normally urges this control rod toward and into the compartment 12.

Secured to the operating rod 23 within the compartment 13 is a spring catch member 45 which, when the valve is seated, is arranged outwardly from the valve as regards the squared portion 35 of the operating rod 34. This operating rod extends immediately adjacent the rod 23 and has formed therein a notch 46 alignable with the spring catch 45 by compression of the spring 44 resulting from longitudinal shifting of the operating rod 34, and this notch is accordingly held out of alignment with this spring catch. It will be seen that by forcing the control rod 33 longitudinally to unseat the valve against the pressure of the spring 26 through the medium of the handle 25, the spring catch 45 will be moved to the opposite side of the squared portion 35 of the control rod 34 and upon release of the handle will engage against this control rod and maintain the valve 19 in open position, thus permitting passage of air entering through the port 16, through the port 21, into the compartment 12. It will likewise be seen that when the pressure within the compartment 12 arrives at a predetermined point the spring 44 will be compressed sufficiently to have shifted the operating rod longitudinally to align the notch 46 with the spring catch 45 with the result that the spring catch may pass therethrough and does pass therethrough, because of the action of the spring 26, thus releasing the valve 19 and causing the same to be seated.

It will furthermore be obvious that if so desired the valve may be seated by simply engaging the operating handle 36 of the operating rod and drawing the operating rod longitudinally to align the notch with the spring catch. It will furthermore be obvious that by oscillation of the sleeve 32, this sleeve may be moved a greater distance into or out of the compartment 12 as may be desired, with the result that the operating rod 34 must be shifted a greater or less distance, as the case may be, before the notch is aligned with this spring catch. Since this shifting of the rod a greater distance results in further compression of the spring it will require a greater pressure to release the valve and since shifting through a shorter distance requires a lesser pressure to compress the spring the desired distance the valve will be seated at a lower pressure. In order to provide for this shifting the handle 33 hereinbefore mentioned is provided, this handle extending through a curved slot 47 formed in the cover plate 15 of the compartment 13 and provided with indicia corresponding to the pressures represented by the positioning of the handle at various points throughout its length. Accordingly, when it is desired that the valve 19 close at a given pressure, the handle 33 is arranged at a corresponding point in the slot 47 and the operating handle 25 of the operating rod 23 forced inwardly to unseat the valve and lock the same in unseated position. When pressure within the compartment 12 reaches the indicated poundage the spring 44 will be sufficiently compressed to permit alignment of the slot 46 with the spring catch 45 and the valve will be released and seated as hereinbefore described. The compartment 12 has an outlet port 48 corresponding in size to the opening of the tube 22 of the member to be inflated and it will accordingly be seen that the pressure may pass from the compartment 12 to the tube at a higher rate than it will enter through the restricted passage 21 with the result that the pressure of the compartment 12 is the pressure within the tube and not the pressure from the source. Accordingly, the setting of the handle at a predetermined poundage upon the gauge slot will result in a discontinuation of the admission of pressure upon creation of said predetermined poundage within the tube.

The means for connecting the outlet port 48 of the compartment 12 with the stem 22 of the tube are provided in a device more clearly shown in Figure 2. This device comprises a cap portion 49 adapted to have a sliding fit over the upper end of the tube valve stem and having inside a soft resilient seat 50 in an upwardly extending squared hollow stem 51, the end of which is bent at an angle as indicated at 52 and adapted for connection with a flexible conduit 53 communicating at its opposite end with the port 48. Slidably mounted upon the portion 51 of the stem is a yoke 54 having a pair of arms 55 spaced apart a distance slightly greater than the external diameter of the engaged threaded portion of the tube stem. These arms are formed of resilient material and have upon their adjacent faces V-shaped lugs 56 adapted to engage in the threads of the valve cap and one of the arms is provided upon its outer surface with a seat 57 and above this seat with a stop lug 58. Secured to the stem 51 in spaced relation to the yoke 54 is an outer cap member 59 having extended through the wall thereof a threaded cam member 60, the threads being such as to advance the cam very rapidly. The outer end of this member has an operating handle 61 and the inner end of the cam is V-shaped to engage in the seat 58 of the yoke arm. Upon its side face this cam is provided with a cam surface 62 which, when the end of the cam engages in the seat and forces the arm toward the valve stem to bring the V-shaped lugs 56 thereof into engagement with the threads of the valve stem engages against the stop lug 58 forcing the outer cap 59 downwardly and since this cap is secured to the stem 51 forcing the cap 49 downwardly with the result that the resilient seat 50 thereof is forced very firmly in engagement with the upper end of the valve stem and comes into sealing engagement therewith. Between the yoke 54 and the outer cap member 59 a spring 63 extends, normally bending to hold this cap member in spaced relation to the yoke.

From the foregoing it is believed to be obvious that a gauge constructed in accordance with my invention may be very readily operated, simply constructed and may be comparatively cheaply produced. It will furthermore be obvious that the construction hereinbefore set forth is capable of considerable change and modification without materially departing from the spirit of my invention and I accordingly do not limit myself to such specific structure except as hereinafter claimed.

What is claimed is:—

1. In an automatic inflating gauge, a casing including two compartments, one of which is in communication with a source of fluid pressure and with the other compartment, a valve controlling communication between the compartments, an operating rod for the valve, spring means normally maintaining the valve seated, and a means coacting with the operating rod to lock the same in adjusted position with the valve in the open position and shifting upon formation of a predetermined pressure within the second compartment to release the operating rod and permit seating of said valve by said spring, said means including a longitudinally shiftable controlling rod having a notch therein which when aligned with said operating rod permits shifting of the operating rod and seating of the valve, and a spring opposing shifting of said controlling rod in a direction to align said notch with said operating rod.

2. In an automatic inflating gauge, a casing including two compartments, one of which is in communication with a source of fluid pressure and with the other compartment, a valve controlling communication between the compartments, an operating rod for the valve, spring means normally maintaining the valve seated, and a means coacting with the operating rod to lock the same in adjusted position with the valve in the open position and shifting upon formation of a predetermined pressure within the second compartment to release the operating rod and permit seating of the valve by said spring, said means including a longitudinally shiftable controlling rod having a notch therein which when aligned with said operating rod permits shifting of the operating rod and seating of the valve, and a spring opposing shifting of said controlling rod in a direction to align said notch with said operating rod, and means for adjustably varying the tension of said spring.

3. In an automatic inflating gauge, a casing including two compartments, one of which is in communication with a source of fluid pressure and with the other compartment, a valve controlling communication between the compartments, an operative rod for the valve, spring means normally maintaining the valve seated, and a means coacting with the operating rod to lock the same in adjusted position with the valve in the open position and shifting upon formation of a predetermined pressure within the second compartment to release the operating rod and permit seating of the valve by said spring, said means including a longitudinally shiftable controlling rod having a notch therein which when aligned with said operating rod permits shifting of the operating rod and seating of the valve, and a spring opposing shifting of said controlling rod in a direction to align said notch with said operating rod, and means for adjustably varying the tension of said spring, and including a sleeve through which said controlling rod is directed and against which one end of said spring engages, the opposite end of said spring being secured to the controlling rod, the oscillation of said sleeve shifting the sleeve longitudinally to thereby compress the spring or permit the spring to expand and means for rotating said sleeve.

4. In an adjustable pressure responsive device, a cylinder, a sleeve threaded within the cylinder, a rod slidable through the sleeve, means for rotating the sleeve, a piston carried by the rod and operating within the cylinder, and a spring engaging said rod and sleeve and urging said rod in one direction with relation to the sleeve.

5. In a valve release mechanism for a gauge of the character described, two compartments, one of which is in communication with a source of pressure and with the second compartment, a valve controlling communication between the compartments, a spring seating the valve, an operating rod for unseating the valve, and means for locking said operating rod in position with the valve unseated comprising a second rod extending adjacent the first named rod, a spring catch carried by the first named rod and engaging the second named rod to prevent return movement of the first named rod when the valve is unseated, and a notch in the second named rod alignable with the catch of the first named rod to permit passage thereof upon longitudinal shifting of the second named rod in one direction.

6. In a valve release mechanism for a gauge of the characted described, two compartments, one of which is in communication with a source of pressure and with the second compartment, a valve controlling communication between the compartments, a spring seating the valve, an operating rod for unseating the valve, and means for locking said operating rod in position with the valve unseated comprising a second rod extending adjacent the first named rod, a spring catch carried by the first named rod and engaging the second named rod to prevent return movement of the first named rod when the valve is unseated, and a notch in the second named rod alignable with the catch of the first named rod to permit passage thereof upon longitudinal shifting of the second named rod in one direction, and means upon said second rod shifting the rod upon the formation of a predetermined degree of pressure within the second named chamber.

7. In a valve release mechanism for a gauge of the character described, two compartments, one of which is in communication with a source of pressure and with the second compartment, a valve controlling communication between the compartments, a spring seating the valve, an operating rod for unseating the valve, and means for locking said operating rod in position with the valve unseated comprising a second rod extending adjacent the first named rod, a spring catch carried by the first named rod and engaging the second named rod to prevent return movement of the first named rod when the valve is unseated, and a notch in the second named rod alignable with the catch of the first named rod to permit passage thereof upon longitudinal shifting of the second named rod in one direction, and means upon said second rod shifting the rod upon the formation of a predetermined degree of pressure within the second named chamber, an outlet for the second named chamber, means for connecting the second named chamber with the valve stem of a tube to inflate the tube, the outlet from the second named chamber being of the same or greater diameter than the opening of the tube, the inlet to the second named chamber from the first named chamber being of less diameter than the opening of the tube valve.

8. Valve stem engaging means for inflating gauges comprising a cap having a cushioning element therein and having a squared hollow stem, a yoke slidable upon the stem including a pair of arms each having tooth means adapted for engagement in the threads of the stems, an outer cap secured to the first named cap, and means carried by the outer cap for initially forcing the teeth of the yoke into engagement with the threads of the valve stem, and subsequently shifting said outer and inner caps longitudinally with respect to the yoke and thereby compress the cushioning element of the first named cap upon the end of the valve stem.

In testimony whereof I hereunto affix my signature.

HARVEY C. DURHAM.